(12) United States Patent
Liu et al.

(10) Patent No.: US 11,431,190 B2
(45) Date of Patent: Aug. 30, 2022

(54) DC POWER SUPPLY SYSTEM AND METHOD

(71) Applicant: Delta Electronics (Shanghai) CO., LTD, Shanghai (CN)

(72) Inventors: Hongguang Liu, Shanghai (CN); Yanlong Sun, Shanghai (CN); Huan Wang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 17/073,674

(22) Filed: Oct. 19, 2020

(65) Prior Publication Data

US 2021/0135486 A1 May 6, 2021

(30) Foreign Application Priority Data

Oct. 30, 2019 (CN) .......................... 201911045379.7

(51) Int. Cl.
*H02J 9/06* (2006.01)
*H02M 7/04* (2006.01)
*H01F 38/00* (2006.01)

(52) U.S. Cl.
CPC .............. *H02J 9/061* (2013.01); *H01F 38/00* (2013.01); *H02M 7/04* (2013.01)

(58) Field of Classification Search
CPC .......... H02J 9/061; H02J 9/068; H02J 3/0073; H02J 1/00; H02J 9/02; H01F 38/00;
(Continued)

(56) References Cited

U.S. PATENT DOCUMENTS 7,307,361 B1 12/2007 Bendre et al.
2013/0141954 A1* 6/2013 Chang .................... H02J 9/061
363/84

(Continued)

FOREIGN PATENT DOCUMENTS

CN 202309201 U 7/2012
CN 102710004 A 10/2012
(Continued)

OTHER PUBLICATIONS

The Notice of Allowance dated Aug. 18, 2021 for U.S. Appl. No. 17/080,825.

(Continued)

*Primary Examiner* — Lincoln D Donovan
*Assistant Examiner* — Alex W Lam
(74) *Attorney, Agent, or Firm* — Qinghong Xu (57) ABSTRACT

The present disclosure provides a DC power supply system and its control method. The system includes: a first power supply circuit and a second power supply circuit, at least one of the first power supply circuit and the second power supply circuit including a phase shifting transformer, wherein the first power supply circuit includes a number N of first AC/DC conversion circuits, and the second power supply circuit includes a number N of second AC/DC conversion circuits, where N is an integer greater than or equal to 2; an output side of each of the N first AC/DC conversion circuits is electrically connected in parallel with an output side of a corresponding second AC/DC conversion circuit of the N second AC/DC conversion circuits through a DC busbar to form N sets of redundant backup circuits.

13 Claims, 11 Drawing Sheets

(58) Field of Classification Search
CPC ............ H02M 7/04; H02M 7/08; H02M 5/14; H02M 1/325; H02M 3/04; H02M 7/02; H02M 7/043; G06F 1/30
See application file for complete search history.

(56) References Cited

U.S. PATENT DOCUMENTS

| | | |
|---|---|---|
| 2017/0005571 A1 | 1/2017 | Wang et al. |
| 2018/0175619 A1 | 6/2018 | Mayo |
| 2019/0097437 A1* | 3/2019 | Cho .................... H02J 7/00714 |
| 2019/0105724 A1* | 4/2019 | Kawai .............. G01R 19/16528 |
| 2019/0260226 A1 | 8/2019 | Lu et al. |
| 2019/0334276 A1 | 10/2019 | Ichikawa et al. |
| 2020/0006970 A1 | 1/2020 | Chen et al. |
| 2020/0059111 A1 | 2/2020 | Guo et al. |
| 2020/0122265 A1 | 4/2020 | Kawai et al. |
| 2020/0127581 A1 | 4/2020 | Chen et al. |
| 2020/0195125 A1 | 6/2020 | Slepchenkov |
| 2021/0066912 A1 | 3/2021 | Mitsunaga et al. |

FOREIGN PATENT DOCUMENTS

| | | |
|---|---|---|
| CN | 103427463 A | 12/2013 |
| CN | 108923409 A | 11/2018 |
| CN | 110247562 A | 9/2019 |
| EP | 2665152 A2 | 11/2013 |

OTHER PUBLICATIONS

Kevin McCarthy: "Comparing UPS System Design Configurations", Nov. 1, 2004, pp. 1-27, XP055467111.
Extended European Search Report dated Mar. 29, 2021 from EP patent application No. 20204640.5.

* cited by examiner

DC POWER SUPPLY SYSTEM AND METHOD

CROSS REFERENCE

This application is based upon and claims priority to Chinese Patent Application No. 201911045379.7, filed on Oct. 30, 2019, the entire contents of which are incorporated herein by reference.

TECHNICAL FIELD

The present disclosure relates to the field of power electronics technology, and in particular to a DC power supply system and method.

BACKGROUND

Figure 1:
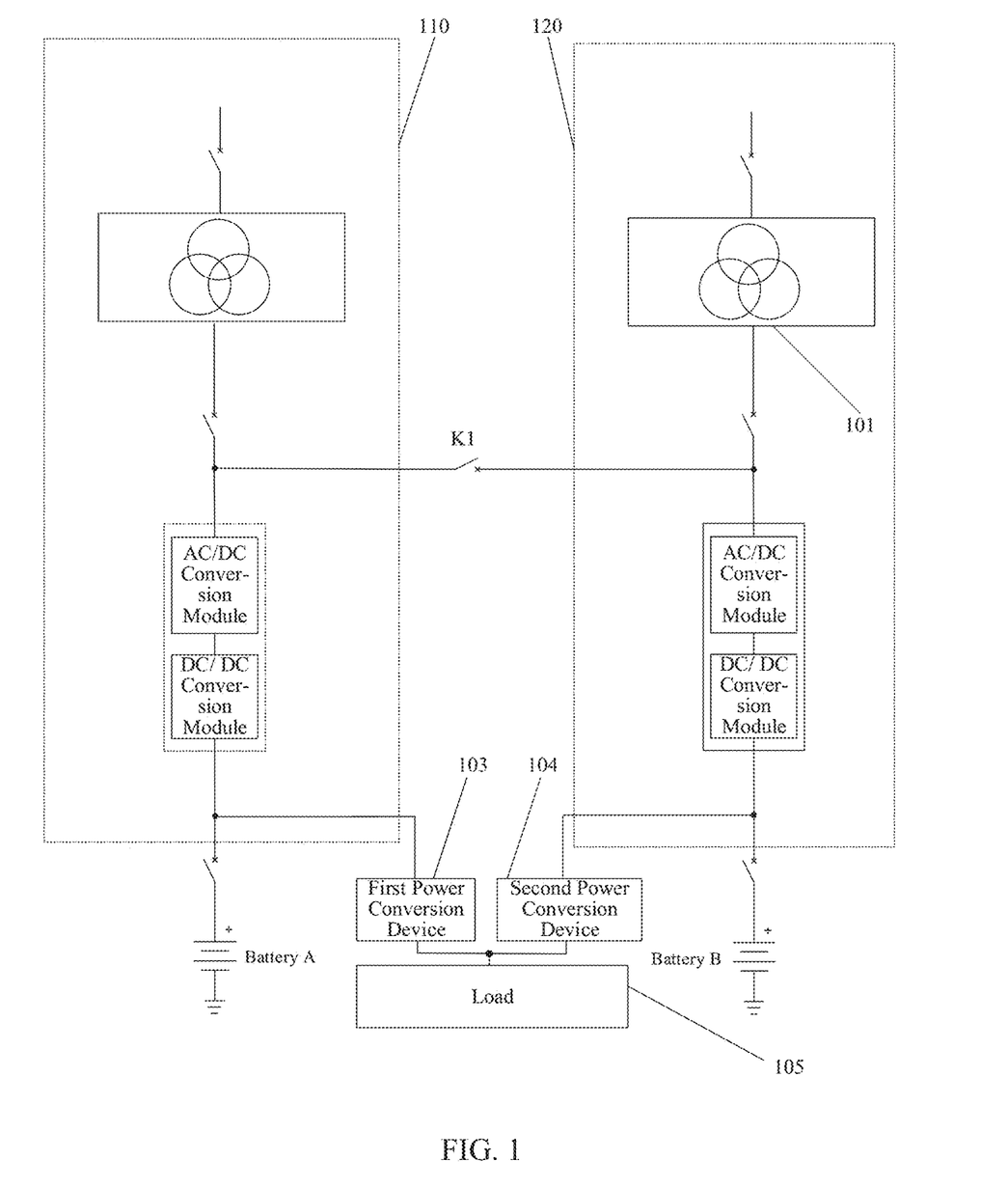
FIG. 1 shows a schematic diagram of a traditional DC power supply scheme in the prior art.

The DC power supply is highly efficient and reliable, and thus has been increasingly used in power supply of data center. As shown in FIG. 1, in a traditional DC power supply scheme, at least two conventional power transformers 101 that convert an AC medium-voltage of 10 kV to an AC low-voltage of 380V are adopted, and each AC low-voltage bus on a secondary side of the transformer can be electrically connected in parallel through a switch K1. Output terminals of a conventional DC power supply system A 110 and a conventional DC power supply system B 120 are respectively electrically connected to two power conversion devices in a load 105, that is, a first power conversion device 103 and a second power conversion device 104. The load 105 can be IT equipment (IT Load). In this way, when the transformer is under repair or one of the power supply systems fails, the parallel connection of the buses on the low-voltage AC 380V side can ensure a redundant power supply for the IT equipment downstream. However, the traditional DC power supply scheme has the disadvantage of being inefficient.

Figure 2:
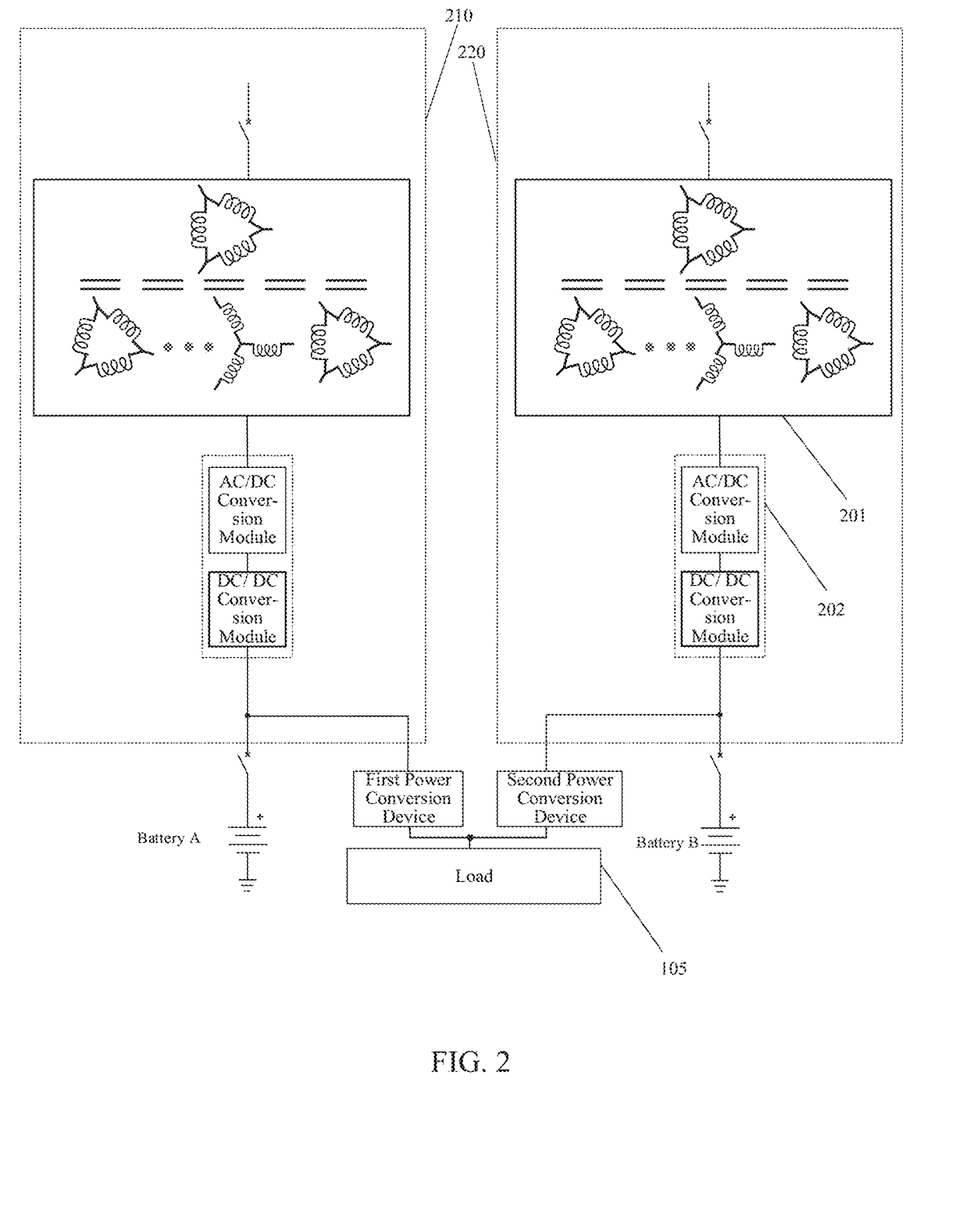
FIG. 2 shows a schematic diagram of a DC power supply scheme using a phase shifting transformer that known to the inventor.

FIG. 2 is a schematic diagram showing a DC power supply scheme using a phase shifting transformer that known to the inventor. As shown in FIG. 2, there are two medium-voltage direct-conversion DC power supply systems, and the output terminals of the medium-voltage direct-conversion DC power supply system A 210 and the medium-voltage direct-conversion DC power supply system B 220 are respectively electrically connected to the two power conversion devices of the load 105. The AC medium voltage of 10 kV is transformed into the AC low voltage of 380V or 270V via the phase shifting transformer 201 and is rectified and regulated by a rectifier system 202, and a corresponding DC output is obtained, which is used to supply power to the downstream load 105. The DC power supply scheme using a phase shifting transformer is approximately 2% more efficient than the traditional DC power supply scheme.

However, there are a plurality of windings on the low-voltage AC side of the phase shifting transformer, and thus the parallel connection of the buses on the low-voltage AC side, which is employed in the traditional DC power supply scheme, cannot be used. As such, in the DC power supply scheme including the phase shifting transformer, when the transformer is under repair or one of the 10 kV sources fails, the power supply to the downstream IT equipment will lack of redundancy, and some IT equipment will be at risk of downtime.

It should be noted that the information disclosed in the Background above is only for enhancement of understanding of the background of the present disclosure, and thus may include information that does not constitute prior art known to those of ordinary skill in the art.

SUMMARY

The present disclosure provides a DC power supply system and method.

According to an aspect of the present disclosure, there is provided a DC power supply system, including: a first power supply circuit and a second power supply circuit, at least one of the first power supply circuit and the second power supply circuit including a phase shifting transformer; the first power supply circuit includes a number N of first AC/DC conversion circuits, and the second power supply circuit includes a number N of second AC/DC conversion circuits, where N is an integer greater than or equal to 2; an output side of each of the N first AC/DC conversion circuits is electrically connected in parallel with an output side of a corresponding second AC/DC conversion circuit of the N second AC/DC conversion circuits through a DC bus-bar to form N sets of redundant backup circuits.

According to another aspect of the present disclosure, there is provided a DC power supply method, applied to the DC power supply system according to the first aspect of the present disclosure, the method including: detecting a DC current on the DC bus-bar, and controlling the DC current based on output powers of the first power supply circuit and the second power supply circuit.

It should be noted that the above general description and the following detailed description are merely exemplary and explanatory and should not be construed as limitation on the present disclosure.

BRIEF DESCRIPTION OF THE DRAWINGS

The accompanying drawings, which are incorporated in the specification and constitute a part of the specification, show embodiments in accordance with the present disclosure, and explain the principles of the present disclosure along with the specification. It is apparent that the drawings in the following description show only some of the embodiments of the present disclosure, and other drawings may be obtained by those skilled in the art according to these drawings without creative effort.

DETAILED DESCRIPTION

Example embodiments will now be described more fully with reference to the accompanying drawings. However, the exemplary embodiments can be embodied in a variety of forms and should not be construed as being limited to the embodiments set forth herein. Instead, these embodiments are provided so that the present disclosure will be comprehensive and complete, and the idea of the exemplary embodiments will be fully communicated to those skilled in the art. The same reference numerals in the drawings denote the same or similar structures, and thus the detailed description thereof will be omitted.

Although the relative terms such as "above" and "below" are used in the specification to describe the relative relationship of one component with respect to another shown in the drawings, these terms are used in this specification for convenience only, for example, according to the exemplary direction in the accompanying drawings. It will be understood that if the device shown in the drawings is flipped upside down, the component described as "above" will become the "below" component. When one structure is "above" another, it may indicate that the structure is integrally formed on the other structure, the structure is "directly" disposed on the other structure, or the structure is "indirectly" disposed on the other structure through another structure.

The terms of "a", "an", "the". "said" and "at least one" are used to indicate the existence of one or more elements, components, etc.; the terms of "including" and "having" are used to indicate an inclusive meaning and indicate that there may be additional elements, components, etc. in addition to the listed elements, components, etc.; the terms of "first", "second", and "third" etc. are used merely as marks, but not as any limitation on the number of objects.

To solve the above technical problem, a DC power supply system is provided in the exemplary embodiment to implement redundant power supply to the load.

A DC power supply system in the embodiment of the present disclosure includes a first power supply circuit and a second power supply circuit. At least one of the first power supply circuit and the second power supply circuit includes a phase shifting transformer. The first power supply circuit includes a number N of first AC/DC conversion circuits, and the second power supply circuit includes a number N of second AC/DC conversion circuits, where N is an integer greater than or equal to 2. Each of the output sides of the N first AC/DC conversion circuits is electrically connected in parallel with a corresponding one of the output sides of the N second AC/DC conversion circuits through a DC busbar so as to form N sets of redundant backup circuits.

As such, when the power grid supplying power to the first power supply circuit fails or the phase shifting transformer of the first power supply circuit is under repair, the output sides of the second AC/DC conversion circuits of the second power supply circuit can provide power through the DC busbar in replacement of the first power supply circuit, thereby achieving redundant power supply to the load.

Figure 3:
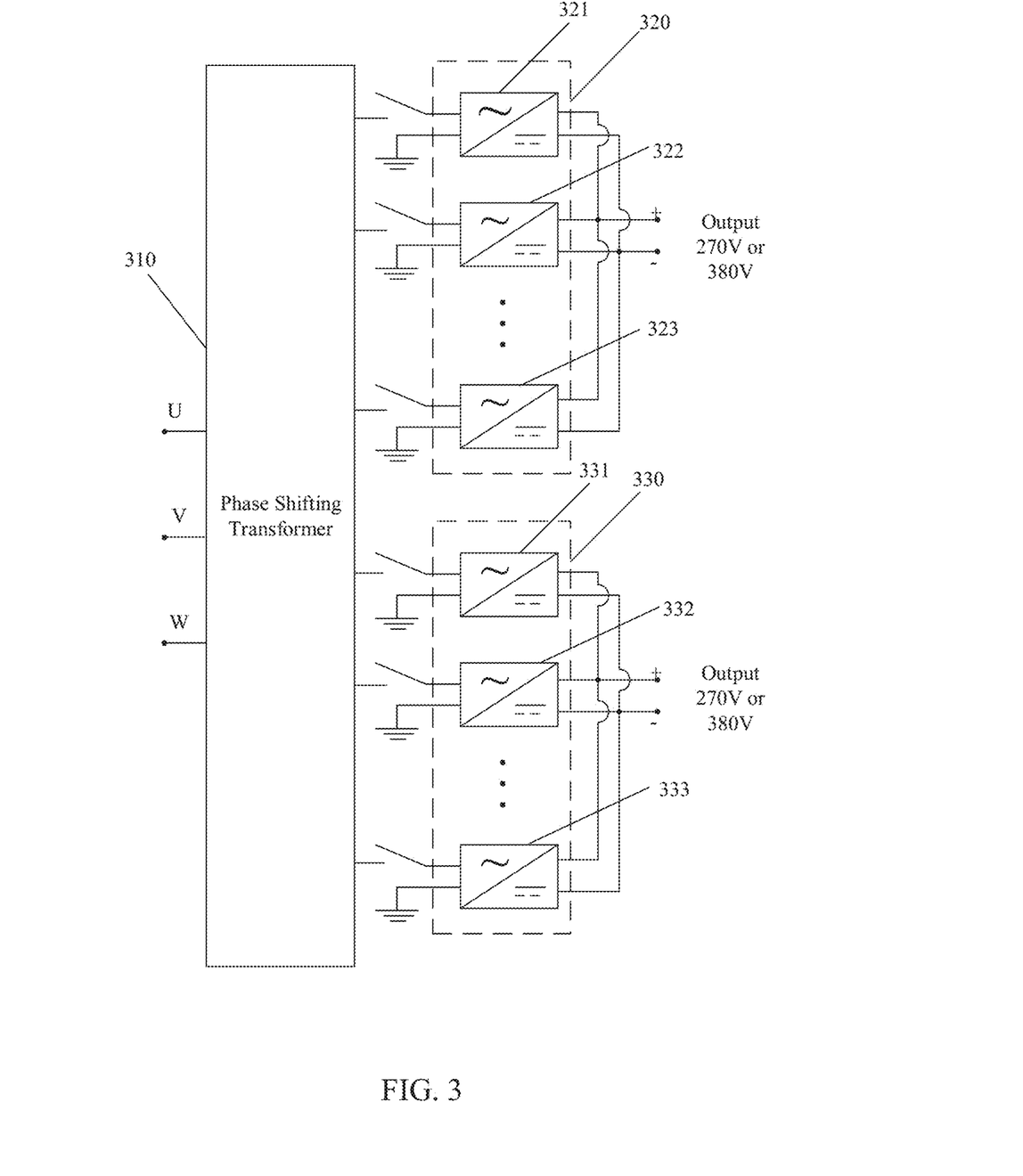
FIG. 3 shows a schematic diagram of a power supply circuit in an embodiment of the present disclosure.

In the embodiment of the present disclosure, the first AC/DC conversion circuit and the second AC/DC conversion circuit may each include a plurality of AC/DC conversion units electrically connected in parallel on the output side. As shown in FIG. 3, the first AC/DC conversion circuit 320 may include an AC/DC conversion unit 321, an AC/DC conversion unit 322, and an AC/DC conversion unit 323. The second AC/DC conversion circuit 330 may include an AC/DC conversion unit 331, an AC/DC conversion unit 332, and an AC/DC conversion unit 333. Each of the AC/DC conversion units is electrically connected to the phase shifting transformer 310. However, in practical applications, the number of AC/DC conversion units in the first AC/DC conversion circuit or the second AC/DC conversion circuit is not limited thereto.

As shown in FIGS. 4 to 9, the input sides of the first power supply circuit 411 and the second power supply circuit 412 are electrically connected to two separate AC power sources, respectively. Herein, the AC power source may be a power grid or an electric generator that provides 10 KV AC power.

Figure 4:
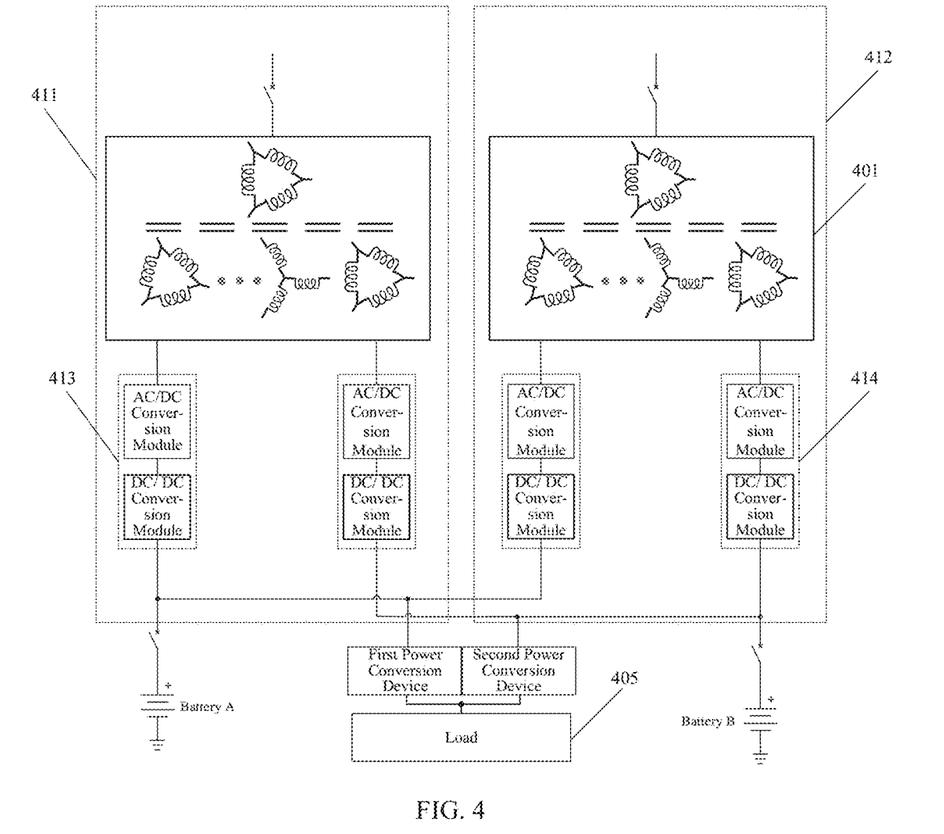
FIG. 4 shows a schematic diagram of a DC power supply system in an embodiment of the present disclosure.

In an embodiment of the present disclosure, each load includes a first power conversion device and a second power conversion device. As shown in FIG. 4, the first power conversion device and the second power conversion device respectively include a plurality of Power Supply Units (PSUs) which are electrically connected in parallel, and supply power to the load 405 simultaneously.

In the embodiment of the present disclosure, in each load, the output sides of the first power conversion device and the second power conversion device are electrically connected in parallel to provide redundant backup power for the load.

In an embodiment of the present disclosure, N is an even number. The DC power supply system includes N sets of redundant backup circuits configured to supply power to a number N/2 of loads, and every two of the N sets of redundant backup circuits as a unit are electrically connected to one corresponding load. In one set of the redundant backup circuits of each unit, the output side of the first AC/DC conversion circuit and the output side of the second AC/DC conversion circuit are both electrically connected to an input side of the first power conversion device of a corresponding load; in the other set of the redundant backup circuits of the unit, the output side of the first AC/DC conversion circuit and the output side of the second AC/DC conversion circuit are both electrically connected to an input side of the second power conversion device of the corresponding load.

As shown in FIG. 4, assuming N=2, the output sides of two first AC/DC conversion circuits 413 and the output sides of two second AC/DC conversion circuits 414 are electrically connected in parallel in one-to-one correspondence through the DC buses to form two sets of redundant backup circuits which supply power to the load 405.

Figure 5:
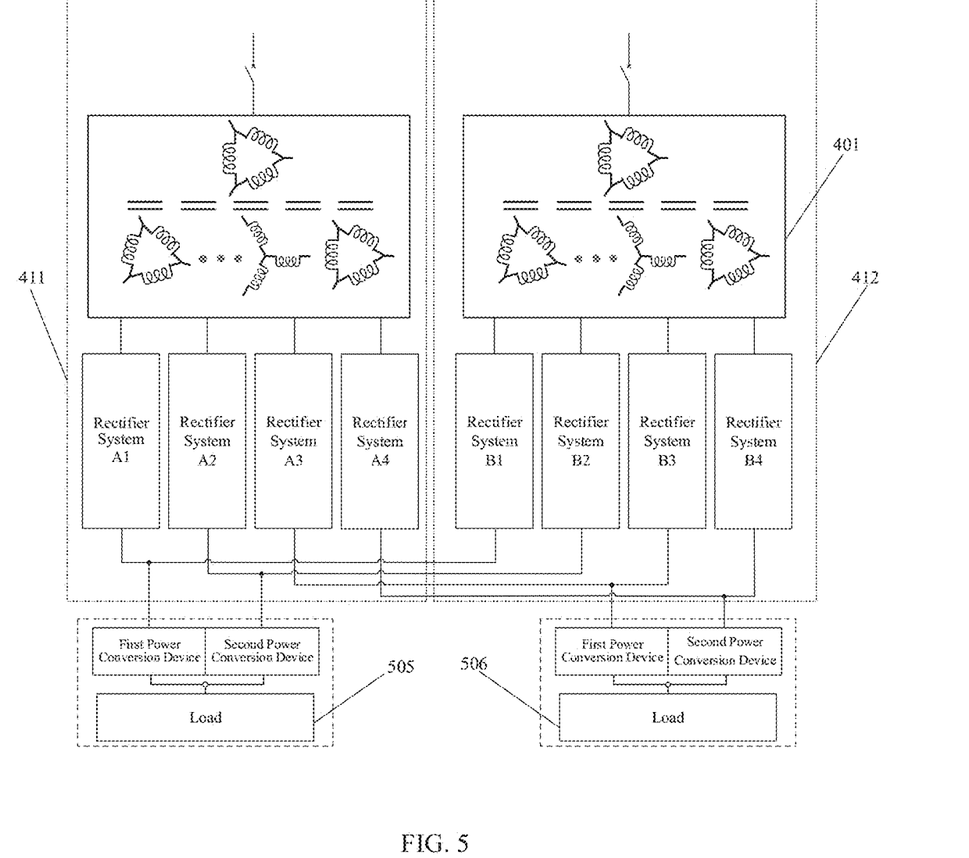
FIG. 5 shows a schematic diagram of a DC power supply system in another embodiment of the present disclosure.

As shown in FIG. 5, assuming N=4, the DC power supply system is configured to supply power to two loads, that is, the load 505 and the load 506. Each of the first power supply circuit 411 and the second power supply circuit 412 includes a phase shifting transformer 401. The first power supply circuit 411 includes four first AC/DC conversion circuits, that is, the rectifier systems A1 to A4. The second power supply circuit 412 includes four second AC/DC conversion circuits, that is, rectifier systems B1 to B4. The output sides of the four first AC/DC conversion circuits are electrically connected in parallel with the output sides of the four second AC/DC conversion circuits in one-to-one correspondence to form four sets of redundant backup circuits. Every two of the four sets of redundant backup circuits as a unit are electrically connected to each of the two loads in one-to-one correspondence.

In the embodiment of the present disclosure, the rectifier system A1 and the rectifier system B1 electrically connected at the output sides form one set of redundant backup circuits, and the rectifier system A2 and the rectifier system B2 electrically connected at the output sides form another set of redundant backup circuits. These two sets of redundant backup circuits as a unit are electrically connected to the load 505. The rectification and voltage regulation system A3 and the rectification and voltage regulation system B3 electrically connected at the output sides form one set of redundant backup circuits, and the rectifier system A4 and the rectifier system B4 electrically connected at the output sides form another set of redundant backup circuits. These two sets of redundant backup circuits as a unit are electrically connected to the load 506.

Figure 6:
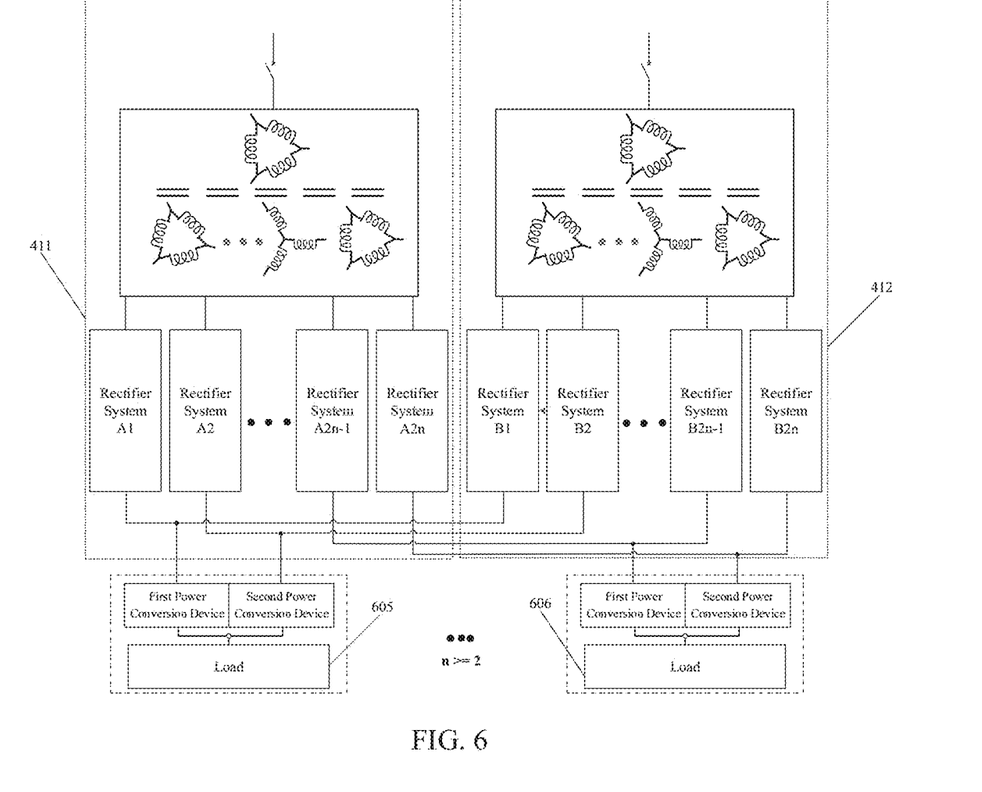
FIG. 6 shows a schematic diagram of a DC power supply system in still another embodiment of the present disclosure.

As shown in FIG. 6, assuming N=2n, where n is an integer greater than or equal to 1. The first power supply circuit 411 includes a number 2n of first AC/DC conversion circuits, that is, rectifier systems A1 to A2$n$, and the second power supply circuit 412 includes a number 2n of second AC/DC conversion circuits, that is, rectifier systems B1 to B2$n$. The output sides of the 2n first AC/DC conversion circuits are electrically connected in parallel with the output sides of the 2n second AC/DC conversion circuits in the one-to-one correspondence through the DC buses to form 2n sets of redundant backup circuits to supply power to the n loads.

The rectifier system A1 and the rectifier system B1 electrically connected at output sides form one set of redundant backup circuits, and the rectifier system A2 and the rectifier system B2 electrically connected at output sides form another set of redundant backup circuits. These two sets of redundant backup circuits as a unit are electrically connected to the load 605. The rectifier system A2$n$−1 and the rectifier system B2$n$−1 electrically connected at output sides form one set of redundant backup circuits, and the rectifier system A2$n$ and the rectifier system B2$n$ electrically connected at output sides form another set of redundant backup circuits. These two sets of redundant backup circuits as a unit are electrically connected to the load 606.

In an embodiment of the present disclosure, the DC power supply system can also be configured to supply power to N loads, and the N sets of redundant backup circuits are electrically connected to the N loads in the one-to-one correspondence. In each set of the redundant backup circuits, the output side of the first AC/DC conversion circuit and the output side of the second AC/DC conversion circuit are electrically connected in parallel and then electrically connected to both the input sides of the first power conversion device and the input side of the second power conversion device of the corresponding load.

Figure 7:
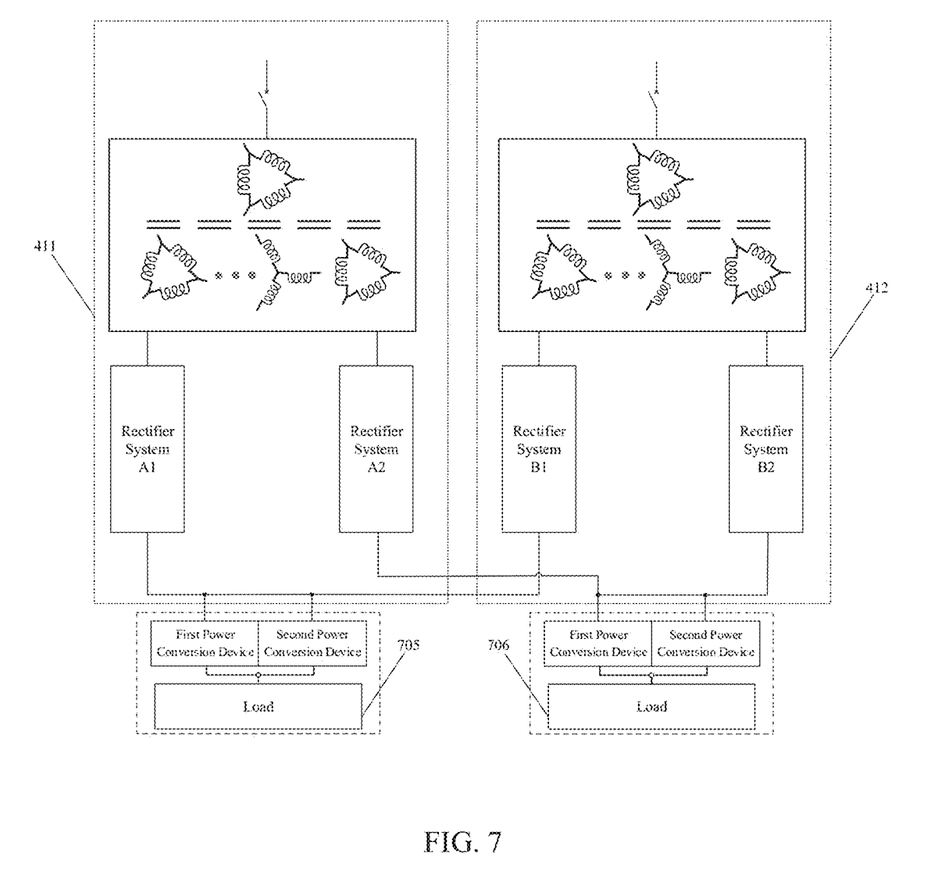
FIG. 7 shows a schematic diagram of a DC power supply system in still another embodiment of the present disclosure.

As shown in FIG. 7, assuming N=2, the first power supply circuit 411 includes two first AC/DC conversion circuits, that is, the rectifier systems A1 and A2, and the second power supply circuit 412 includes two second AC/DC conversion circuits, that is, the rectifier systems B1 and B2. The output sides of the two first AC/DC conversion circuits and the output sides of the two second AC/DC conversion circuits are electrically connected in parallel in the one-to-one correspondence through the DC buses to form two sets of redundant backup circuits which supply power to two loads, respectively.

The rectifier system A1 and the rectifier system B1 electrically connected at output sides form one set of redundant backup circuits and are electrically connected to both the first power conversion device and the second power conversion device of a load 705. The rectifier system A2 and the rectifier system B2 electrically connected at output sides form the other set of redundant backup circuits and are electrically connected to both the first power conversion device and the second power conversion device of a load 706.

Figure 8:
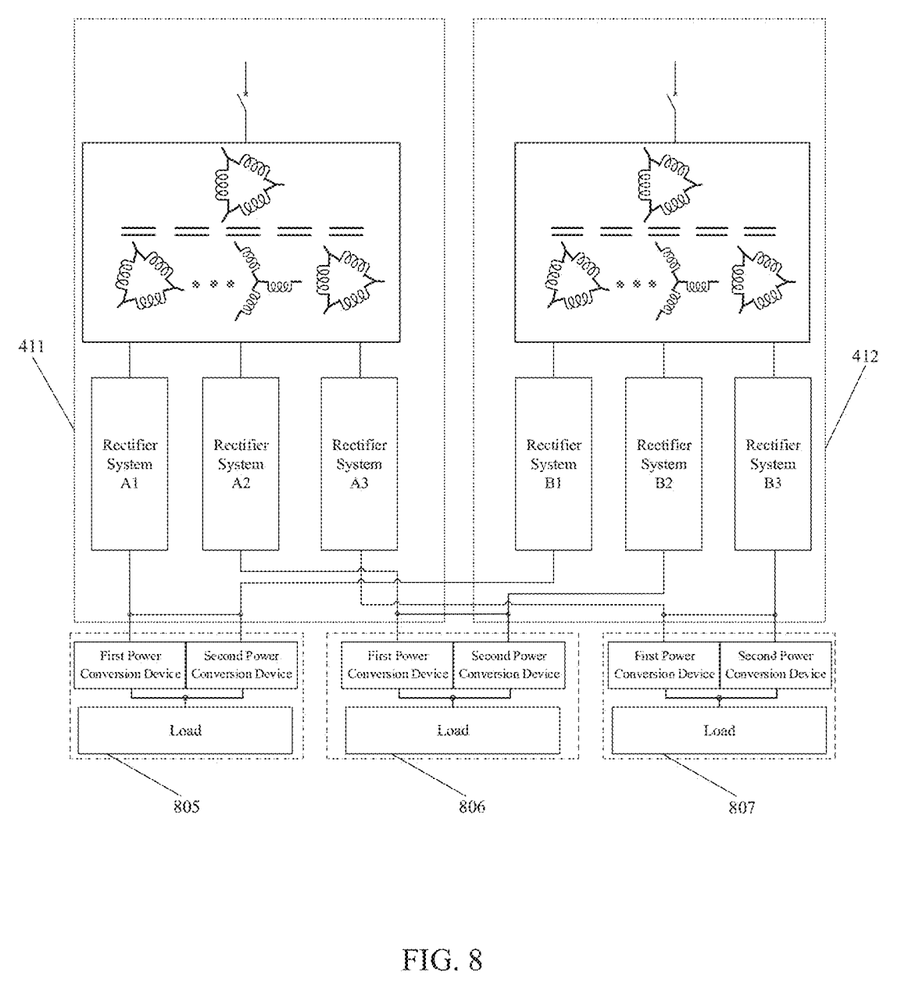
FIG. 8 shows a schematic diagram of a DC power supply system in still another embodiment of the present disclosure.

As shown in FIG. 8, assuming N=3, the first power supply circuit 411 includes three first AC/DC conversion circuits, that is, the rectifier systems A1 to A3, and the second power supply circuit 412 includes three second AC/DC conversion circuits, that is, the rectifier systems B1 to B3. The output sides of the three first AC/DC conversion circuits and the output sides of the three second AC/DC conversion circuits are electrically connected in parallel in the one-to-one correspondence through the DC buses to form three sets of redundant backup circuits which supply power to three loads respectively.

The rectifier system A1 and the rectifier system B1 electrically connected at the output sides, as one set of redundant backup circuits, are electrically connected to both the first power conversion device and the second power conversion device of a load 805. The rectifier system A2 and the rectifier system B2 electrically connected at the output sides, as another set of redundant backup circuits, are electrically connected to both the first power conversion device and the second power conversion device of a load 806. The rectifier system A3 and the rectifier system B3 electrically connected at the output sides, as another set of redundant backup circuits, are electrically connected to both the first power conversion device and the second power conversion device of a load 807.

Figure 9:
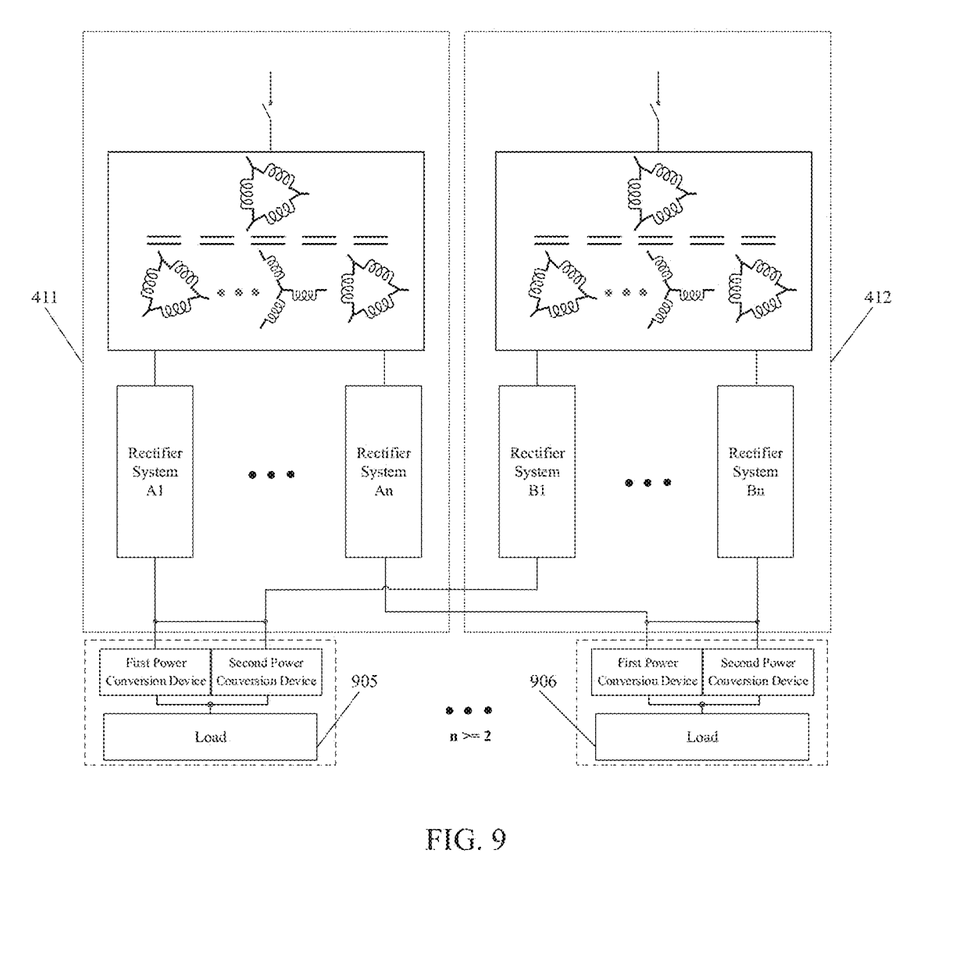
FIG. 9 shows a schematic diagram of a DC power supply system in still another embodiment of the present disclosure.

As shown in FIG. 9, assuming N=n, the first power supply circuit 411 includes a number n of first AC/DC conversion circuits, that is, the rectifier systems A1 to An, and the second power supply circuit 412 includes a number n of second AC/DC conversion circuits, that is, the rectifier systems B1 to Bn. The output sides of the n first AC/DC conversion circuits and the output sides of the n second AC/DC conversion circuits are electrically connected in parallel in the one-to-one correspondence through the DC buses to form n sets of redundant backup circuits which supply power to the n loads.

The rectifier system A1 and the rectifier system B1 electrically connected at the output sides, as one set of the redundant backup circuits, are electrically connected to both the first power conversion device and the second power conversion device of the load 905. The rectifier system An and the rectifier system Bn electrically connected at the output sides, as another set of the redundant backup circuits, are electrically connected to both the first power conversion device and the second power conversion device of the load 906.

In the embodiment of the present disclosure, voltages on the output sides of the first AC/DC conversion circuit and the second AC/DC conversion circuit both can be 270V or 380V.

In each set of the redundant backup circuits, the output sides of the first AC/DC conversion circuit and the second AC/DC conversion circuit are also electrically connected in parallel with a DC energy storage device, such as battery A and battery B shown in FIG. 4. The DC energy storage device can store electrical energy, or can discharge when the phase shifting transformer of the DC power supply system is under repair or the power grid fails, that is, to provide redundant backup power for the load.

In an embodiment of the present disclosure, one or both of the first power supply circuit and the second power supply circuit may be a medium voltage direct-conversion DC power supply system using a phase shifting transformer. One of the first power supply circuit and the second power supply circuit may be a conventional DC power supply system using a conventional transformer.

Figure 10:
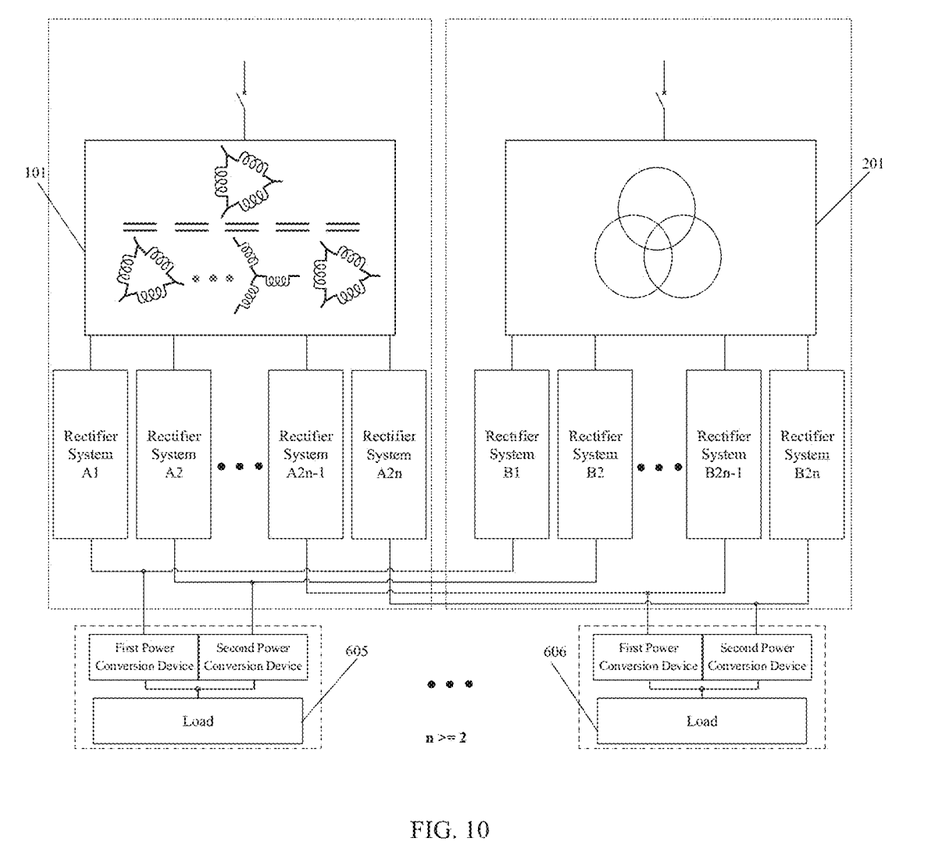
FIG. 10 shows a schematic diagram of a DC power supply system in still another embodiment of the present disclosure.
Figure 11:
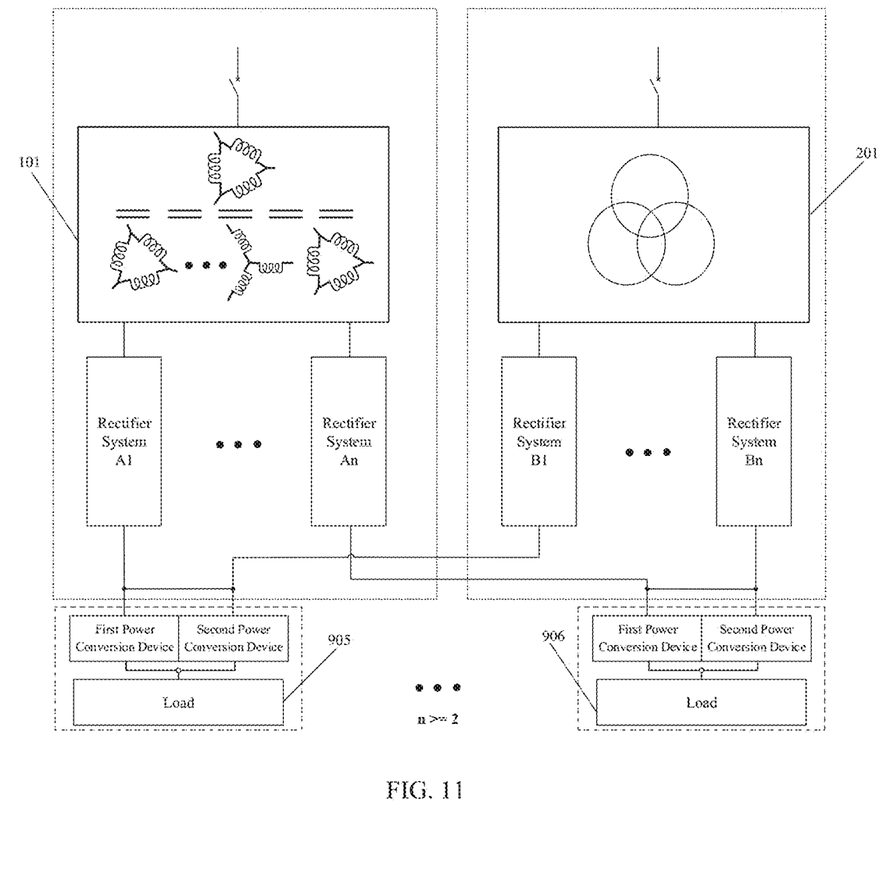
FIG. 11 shows a schematic diagram of a DC power supply system in still another embodiment of the present disclosure.

As shown in FIG. 10 and FIG. 11, the first power supply circuit employs a phase shifting transformer 101, and the second power supply circuit employs a conventional transformer 201.

The connection of the first AC/DC conversion circuits and the second AC/DC conversion circuits of the DC power supply system as shown in FIG. 10 is the same as that shown in FIG. 6, so it will not be repeated here.

The connection of the first AC/DC conversion circuits and the second AC/DC conversion circuits of the DC power supply system as shown in FIG. 11 is the same as that shown in FIG. 9, so it will not be repeated here.

The first power supply circuit includes a phase shifting transformer, and a secondary side of the phase shifting transformer may include a set of phase shifting windings. The input side of each of the first AC/DC conversion circuits is electrically connected to the set of phase shift windings. The secondary side of the phase shifting transformer may also include n sets of phase shifting windings. The input side of each of the first AC/DC conversion circuits is electrically connected to a corresponding set of the n sets of the phase shift windings.

In an embodiment of the present disclosure, one set of phase shifting windings may include 18 windings, but in practical applications, the number of windings in one set of phase shifting windings is not limited thereto.

In an embodiment of the present disclosure, there is also provided a control method for the DC power supply system in the above technical solution. The control method includes: detecting a DC current of the DC busbar, and controlling the DC current based on output powers of the first power supply circuit and the second power supply circuit.

In this way, wen the power grid supplying power to the first power supply circuit fails, or the phase shifting transformer of the first power supply circuit is under repair, a change of the DC current of the DC busbar, that is, a change of output currents of the first power supply circuit and the second power supply circuit, can be detected, and thus the DC current can be controlled based on the change of the output currents of the first power supply circuit and the second power supply circuit, so that the second AC/DC conversion circuit of the second power supply circuit can provide power through the DC busbar in replacement of the first power supply circuit, thereby achieving redundant power supply to the load.

In the DC power supply system and control method in the embodiments of the present disclosure, the redundant backup circuit is formed by electrically connecting the output sides of at least two AC/DC conversion circuits of the first power supply circuit and the output sides of at least two AC/DC conversion circuits of the second power supply circuit through the busbar, so that the power supply to the load is normally supplied during the repair of the phase shifting transformer or the failure of part of the grid, which achieves a redundant design of the power supply to the load and the stable operation of the DC power supply system.

It is easy for those skilled in the art to think of other embodiments of the present disclosure after considering the description and practicing the present disclosure disclosed herein. The present application is intended to cover any variation, use, or adaptation of the present disclosure, which follows general principles of the present disclosure and includes common knowledge or conventional technical measures in the art that are not disclosed in the present disclosure. The description and the embodiments are considered as being illustrative only, and the true scope and spirit of the present disclosure is indicated by the appended claims.

What is claimed is:

1. A DC power supply system, comprising:
   a first power supply circuit and a second power supply circuit, at least one of the first power supply circuit and the second power supply circuit comprising a phase shifting transformer;
   wherein the first power supply circuit comprises a number N of first AC/DC conversion circuits, and the second power supply circuit comprises a number N of second AC/DC conversion circuits, where N is an integer greater than or equal to 2; and
   an output side of each of the N first AC/DC conversion circuits is electrically connected in parallel with an output side of a corresponding second AC/DC conversion circuit of the N second AC/DC conversion circuits through a DC busbar to form N sets of redundant backup circuits,
   wherein the first power supply circuit comprises the phase shifting transformer, a secondary side of the phase shifting transformer comprises N sets of phase shifting windings, and an input side of each of the first AC/DC conversion circuits is electrically connected to a corresponding set of the N sets of phase shifting windings.

2. The DC power supply system according to claim 1, wherein input sides of the first power supply circuit and the second power supply circuit are electrically connected to two separate AC power sources, respectively.

3. The DC power supply system according to claim 1, wherein the DC power supply system is configured to supply power to N loads, each of the N sets of redundant backup circuits is electrically connected to a corresponding load of the N loads, and each of the N loads comprises a first power conversion device and a second power conversion device; and
   wherein, in each set of redundant backup circuits, the output sides of the first AC/DC conversion circuit and the second AC/DC conversion circuit are electrically connected to both an input side of the first power conversion device and an input side of the second power conversion device of a corresponding load of the N loads.

4. The DC power supply system according to claim 1, wherein the N is an even number, the DC power supply system is configured to supply power to N/2 loads, every two of the N sets of redundant backup circuits as a unit are electrically connected to a corresponding load of the N/2 loads, and each of the loads comprises a first power conversion device and a second power conversion device;
   wherein, in one set of the redundant backup circuits of the unit, the output side of the first AC/DC conversion circuit and the output side of the second AC/DC conversion circuit are both electrically connected to an input side of the first power conversion device of a corresponding load; in the other set of the redundant backup circuits of the unit, the output side of the first AC/DC conversion circuit and the output side of the second AC/DC conversion circuit are both electrically connected to an input side of the second power conversion device of the corresponding load.

5. The DC power supply system according to claim 3, wherein the first AC/DC conversion circuit and the second AC/DC conversion circuit both comprise a plurality of AC/DC conversion units which are electrically connected in parallel on output sides, and each of the AC/DC conversion units is electrically connected to the phase shifting transformer.

6. The DC power supply system according to claim 4, wherein the first AC/DC conversion circuit and the second AC/DC conversion circuit both comprise a plurality of AC/DC conversion units which are electrically connected in parallel on output sides, and each of the AC/DC conversion units is electrically connected to the phase shifting transformer.

7. The DC power supply system according to claim 1, wherein voltages on the output sides of the first AC/DC conversion circuit and the second AC/DC conversion circuit are both 270V or both 380V.

8. The DC power supply system according to claim 3, wherein in each set of the redundant backup circuits, the output sides of the first AC/DC conversion circuit and the second AC/DC conversion circuit are further electrically connected in parallel with a DC energy storage device.

9. The DC power supply system according to claim 4, wherein in each set of the redundant backup circuits, the output sides of the first AC/DC conversion circuit and the second AC/DC conversion circuit are further electrically connected in parallel with a DC energy storage device.

10. The DC power supply system according to claim 1, wherein each set of the phase shifting windings comprises 18 windings.

11. The DC power supply system according to claim 3, wherein in each of the N loads, the output sides of the first power conversion device and the second power conversion device are electrically connected in parallel.

12. The DC power supply system according to claim 4, wherein in each of the N/2 loads, the output sides of the first power conversion device and the second power conversion device are electrically connected in parallel.

13. A control method for a DC power supply system, wherein the DC power supply system comprising a first power supply circuit and a second power supply circuit, at least one of the first power supply circuit and the second power supply circuit comprising a phase shifting transformer, wherein the first power supply circuit comprises a number N of first AC/DC conversion circuits, and the second power supply circuit comprises a number N of second AC/DC conversion circuits, where N is an integer greater than or equal to 2, and an output side of each of the N first AC/DC conversion circuits is electrically connected in parallel with an output side of a corresponding second AC/DC conversion circuit of the N second AC/DC conversion circuits through a DC bus-bar to form N sets of redundant backup circuits, wherein the first power supply circuit comprises the phase shifting transformer, a secondary side of the phase shifting transformer comprises N sets of phase shifting windings, and an input side of each of the first AC/DC conversion circuits is electrically connected to a corresponding set of the N sets of phase shifting windings, the method comprising:
　　detecting a DC current of the DC busbar; and
　　controlling the DC current based on output powers of the first power supply circuit and the second power supply circuit.

\* \* \* \* \*